(12) United States Patent
Kriegstein

(10) Patent No.: US 9,382,154 B2
(45) Date of Patent: Jul. 5, 2016

(54) HYGROSCOPIC CEMENTITIOUS MATERIALS

(71) Applicant: Stewart Kriegstein, Ventura, CA (US)

(72) Inventor: Stewart Kriegstein, Ventura, CA (US)

(*) Notice: Subject to any disclaimer, the term of this patent is extended or adjusted under 35 U.S.C. 154(b) by 150 days.

(21) Appl. No.: 14/158,278

(22) Filed: Jan. 17, 2014

(65) Prior Publication Data

US 2015/0203401 A1   Jul. 23, 2015

(51) Int. Cl.
| | |
|---|---|
| *C04B 16/02* | (2006.01) |
| *C04B 16/06* | (2006.01) |
| *C04B 28/02* | (2006.01) |
| *E02B 3/12* | (2006.01) |
| *C04B 103/46* | (2006.01) |

(52) U.S. Cl.
CPC ............... *C04B 16/02* (2013.01); *C04B 16/06* (2013.01); *C04B 28/02* (2013.01); *E02B 3/128* (2013.01); *C04B 2103/465* (2013.01); *Y02W 30/97* (2015.05)

(58) Field of Classification Search
CPC ....................................................... C04B 16/02
See application file for complete search history.

(56) References Cited

U.S. PATENT DOCUMENTS

| | | | |
|---|---|---|---|
| 3,890,157 A * | 6/1975 | Babcock | C04B 22/00 106/672 |
| 4,390,372 A | 6/1983 | Hardin | |
| 4,650,368 A | 3/1987 | Bayer | |
| 4,732,781 A | 3/1988 | Babcock et al. | |
| 4,839,115 A | 6/1989 | Babcock et al. | |
| 5,108,790 A | 4/1992 | Babcock | |
| 5,207,830 A * | 5/1993 | Cowan | A01K 1/0154 106/672 |
| 5,226,279 A * | 7/1993 | Rendon-Herrero | C04B 41/009 106/33 |
| 5,286,425 A | 2/1994 | Babcock et al. | |
| 5,338,573 A | 8/1994 | Davies et al. | |
| 6,572,697 B2 * | 6/2003 | Gleeson | C04B 28/04 106/705 |
| 8,579,248 B2 | 11/2013 | Ray | |
| 2007/0246857 A1 | 10/2007 | Kurtis et al. | |
| 2009/0311505 A1 | 12/2009 | Tanaka et al. | |
| 2012/0111235 A1 | 5/2012 | Han | |
| 2013/0000523 A1 | 1/2013 | Weerawarna et al. | |
| 2013/0098271 A1 | 4/2013 | Eberwein et al. | |

FOREIGN PATENT DOCUMENTS

| | | |
|---|---|---|
| AU | 512457 | 10/1980 |
| WO | WO-2011/070236 A1 | 6/2011 |

OTHER PUBLICATIONS

PCT International Search Report, International Application No. PCT/US15/11537, Apr. 13, 2015, pp. 1-2.

* cited by examiner

*Primary Examiner* — Paul Marcantoni
(74) *Attorney, Agent, or Firm* — M. Thomas Andersen (57) ABSTRACT

A method is disclosed. The method includes providing a cementitious material, the cementitious material including an absorbing material. The method also includes absorbing a fluid into the absorbing material during hydration of the cementitious material. The method further includes retaining the fluid in the absorbing material after hydration of the cementitious material.

20 Claims, 4 Drawing Sheets

HYGROSCOPIC CEMENTITIOUS MATERIALS

TECHNICAL FIELD

The present disclosure is directed to a material composition and, more particularly, to a hygroscopic cementitious material.

BACKGROUND

Cementitious materials such as, for example, concrete are used in a wide variety of building applications. Cementitious materials may be used in applications involving contact with running or rising water such as, for example, locations on or near coastlines or areas subject to flooding. These locations may experience erosion such as, for example, the erosion of soil and erosion that affects the integrity of structural substructures.

One patent application that describes cementitious materials that may be used in applications involving fluid such as flooding water is U.S. Patent Application No. 2013/0098271 (the '271 patent application) to Eberwein et al., published on Apr. 25, 2013. The '271 patent application discloses dry mortar mixtures including copolymers that absorb water during hydration to optimize water-cement values. The copolymers of the '271 patent application contribute to a sufficiently high water absorption capacity in aqueous systems being attained such as, for example, in the hydraulic setting of a cementitious mixture. However, the copolymers of the cementitious material of the '271 patent application apparently absorb significant water only during hydration. Therefore, the '271 patent application does not disclose a material that may absorb and re-absorb liquid such as, for example, water during conditions such as flooding. Therefore, the copolymers included in the cementitious materials disclosed in the '271 patent application do not provide additional protection for mitigating erosion at a location subject to flooding.

The present disclosure is directed to overcoming one or more of the shortcomings set forth above.

SUMMARY OF THE DISCLOSURE

In one aspect, the present disclosure is directed to a method. The method includes providing a cementitious material, the cementitious material including an absorbing material. The method also includes absorbing a fluid into the absorbing material during hydration of the cementitious material. The method further includes retaining the fluid in the absorbing material after hydration of the cementitious material.

In another aspect, the present disclosure is directed toward a material. The material includes a concrete material in a hydrated state, the concrete material including a super-absorbent material dispersed throughout the concrete material and an aggregate material. The super-absorbent material includes a plurality of passageways extending through the concrete material, and the super-absorbent material is more absorbent than the aggregate material.

DETAILED DESCRIPTION

Figure 1:
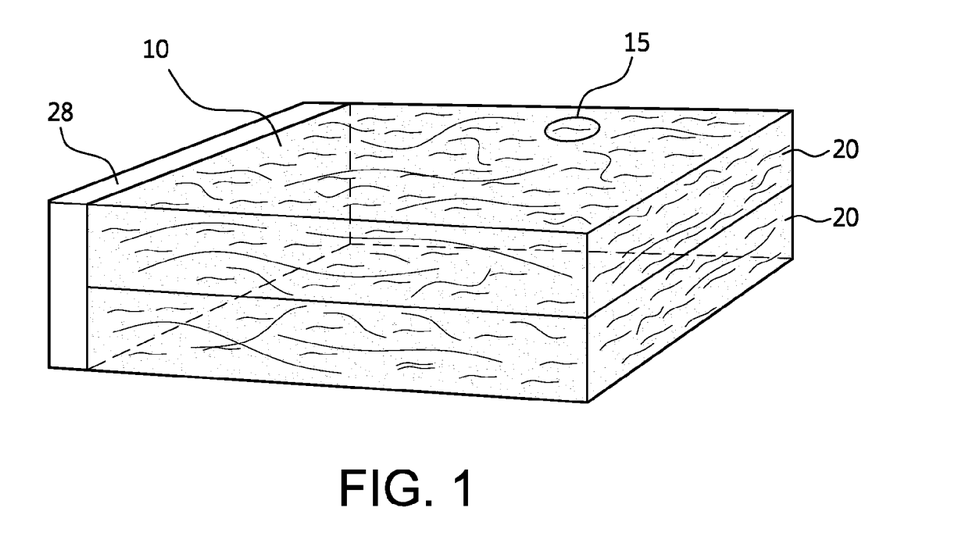
FIG. 1 is a schematic illustration of an exemplary hygroscopic material.

FIG. 1 illustrates an exemplary hygroscopic material 10. Hygroscopic material 10 may be a cementitious composition. For example, hygroscopic material 10 may be concrete. It is also contemplated that hygroscopic material 10 may be any other suitable composition for use in structural applications such as, for example, a mortar composition. Hygroscopic material 10 may include an absorbing material 15.

Hygroscopic material 10 may be mixed material. Hygroscopic material 10 may also be a non-mixing material that may be laid out dry during construction. Hygroscopic material 10 may be placed in any suitable method such as, for example, in a single layer 20 or in multiple layers 20 as illustrated in FIG. 1. Hygroscopic material 10 may be a mixed cementitious material such as, for example, mixed concrete. Hygroscopic material 10 may also be a non-mixing cementitious material such as, for example, non-mixing concrete. Hygroscopic material 10 may be a dry material. Hygroscopic material 10 may also be a mixed cementitious material including water. Hygroscopic material 10 may include binder such as, for example, cement such as Portland cement. The binder may be a rapid setting cement binder. Hygroscopic material 10 may also include aggregates such as, for example, sand and/or rock (as further described below). Hygroscopic material 10 may further include admixtures that improve the characteristics of the mix and of absorbing material 15 such as, for example, plasticizers, accelerating concrete admixtures, water-reducing admixtures, shrinkage reducing admixtures, set retarding admixtures, and/or admixtures for air entrainment. Hygroscopic material 10 may also include admixtures that increase a volume of absorbing material 15 and/or other elements disposed in hygroscopic material 10.

Hygroscopic material 10 may be mass concrete that does not contain reinforcement. It is also contemplated that hygroscopic material 10 may be other types of concrete such as, for example, unreinforced concrete. For example, hygroscopic material 10 may be unreinforced mass concrete. Hygroscopic material 10 may also be reinforced concrete that is reinforced with any suitable reinforcing material. For example, hygroscopic material 10 may be concrete that is reinforced with any suitable non-corroding reinforcement such as, for example, fiberglass reinforcement, and/or carbon fiber reinforcement. Also, for example, hygroscopic material 10 may be concrete that is reinforced with any suitable metallic reinforcement such as, for example, reinforcing bars, mesh reinforcement, and/or metal wire reinforcement.

Absorbing material 15 may be any suitable material for absorbing a fluid in a cementitious composition. Absorbing material 15 may be fully incorporated throughout hygroscopic material 10. As illustrated in FIG. 1, absorbing material 15 may be disposed within hygroscopic material 10. Absorbing material 15 may include a super-absorbent material that absorbs a greater amount of fluid than coarse or fine aggregate material used in cementitious materials. For example, absorbing material 15 may include a super-absorbent material that may absorb a greater amount of fluid than a coarse aggregate for concrete (e.g., gravel and/or crushed stone having a diameter, for example, of between about ⅜" and about 1½") or a fine aggregate for concrete (e.g., sand and/or crushed stone having a diameter, for example, small enough to pass through a ⅜" sieve). Thus, absorbing material 15 may include a super-absorbent material that is more absorbent than coarse or fine aggregate material used in cementitious materials of hygroscopic material 10 such as, for example, a coarse aggregate for concrete or a fine aggregate for concrete. For example, absorbing material 15 may include a super-absorbent material that is a plurality of fibers. For example, absorbing material 15 may include a super-absorbent material that is a plurality of micro fibers. The plurality of micro fibers may be super-absorbing micro fibers. Absorbing material 15 may include a super-absorbent material that is a tubular material for absorbing a fluid. For example, absorbing material 15 may include a super-absorbent material that is a plurality of tubular-shaped fibers. Absorbing material 15 may include a super-absorbent material that is natural and/or synthetic absorbent material. For example, absorbing material 15 may include a super-absorbent material that is a natural and/or synthetic fiber. Absorbing material 15 may include a super-absorbent material that is a fiber material such as, for example, cellulose fibers, cotton, and/or paper. Absorbing material 15 may include a super-absorbent material that is a nano structure for absorbing a fluid such as, for example, nanotubes. Absorbing material 15 may include a super-absorbent material that is any suitable micro-size material for absorbing water in a cementitious composition.

Absorbing material 15 may both absorb and release a fluid, thereby affecting a weight (e.g., weight=m*g, where w is weight, m is mass, and g is the acceleration of gravity; sometimes referred to by one of ordinary skill in the art as "relative weight to mass" or as "mass") of hygroscopic material 10. A weight of hygroscopic material 10 may increase as a fluid is absorbed into absorbing material 15. A weight of hygroscopic material 10 may decrease as a fluid is removed from absorbing material 15. Absorbing material 15 may absorb a fluid, hold the fluid for a time period, and then release some or all of the fluid following the time period. The time period may be any suitable time period such as, for example, a few minutes, a few hours, a few days, or a few months. Absorbing material 15 may thereby temporarily absorb a fluid. It is also contemplated that absorbing material 15 may permanently absorb some or all of a fluid.

Figure 2:
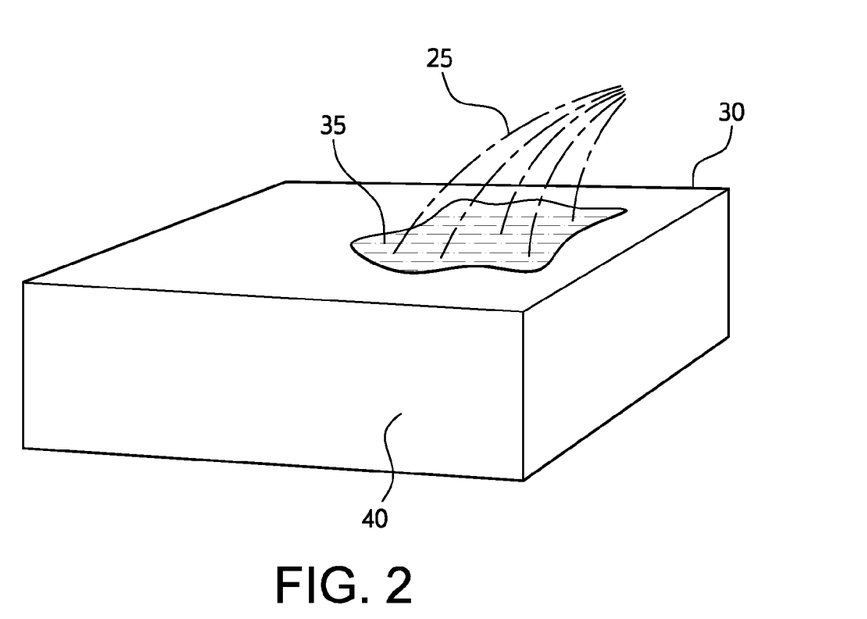
FIG. 2 is another schematic illustration of an exemplary hygroscopic material.

Hygroscopic material 10 may be a mixed cementitious material such as a concrete mix. Hygroscopic material 10 may also be a non-mix cementitious material that is placed substantially dry. Hygroscopic material 10 may be exposed to a fluid 25, as illustrated in FIG. 2. Fluid 25 may be any suitable liquid or gas such as, for example, water or water vapor. Fluid 25 may be rain water. Fluid 25 may also be a liquid mist applied to a surface 30 of hygroscopic material 10. For example, fluid 25 may be a light mist of water applied to any portion of surface 30 of hygroscopic material 10 following a placement of hygroscopic material 10. Surface 30 may be an entire surface area of hygroscopic material 10. It is also contemplated that fluid 25 may be any other material such as, for example, a compound for use in construction. Fluid 25 may come into contact with some or all portions of surface 30.

Hygroscopic material 10 may be placed using a formwork 28, as illustrated in FIG. 1. Formwork 28 may be any suitable formwork for forming cementitious material such as, for example, wooden formwork utilizing mechanical fasteners, anchors, and/or form restraints. For example, when hygroscopic material 10 is a mixed cementitious material, formwork 28 may be a fully anchored and fastened wooden formwork.

When hygroscopic material 10 is a non-mixing cementitious material, formwork 28 may be subjected to relatively less hydrostatic pressure as compared to mixed cementitious materials. Therefore, in the case that hygroscopic material 10 is a non-mix cementitious material, formwork 28 may require relatively less anchoring and/or form restraints because relatively less hydrostatic pressure may be exerted on formwork 28.

Hygroscopic material 10 may be placed, with or without formwork 28, by any suitable method. For example, hygroscopic material 10 may be placed dry as non-mixing cementitious material with or without formwork 28, placed as a mix with formwork 28 (e.g., poured), placed as a wet mix without formwork 28 (e.g., placed as shotcrete), and/or placed as a dry mix without formwork 28 (e.g., placed as dry mix shotcrete).

As illustrated in FIG. 2, fluid 25 may contact a portion 35 of surface 30. Portion 35 may cover some or all of surface 30 of hygroscopic material 10, and may extend only to a small depth within hygroscopic material 10. For example, portion 35 may extend only a fraction of an inch (e.g., between about ⅛" and about ¾") within hygroscopic material 10. When hygroscopic material 10 is a non-mixing cementitious material, portion 35 may undergo hydration after being contacted by fluid 25.

Combining fluid 25 with cementitious material of hygroscopic material 10 may form a cement paste by a process of hydration. During hydration, the cement paste may both cement together and fill voids between the aggregate, absorbing material 15, and other elements of hygroscopic material 10 described above. The hydration process may involve numerous different chemical reactions that may occur simultaneously and/or in succession. Hydration may cause the components of hygroscopic material 10 described above to bond together to form a solid matrix. After undergoing hydration, hygroscopic material 10 may become a solid, hydrated or crystallized matrix. For example, hygroscopic material 10 may become hardened concrete through hydration.

During hydration of hygroscopic material 10, absorbing material 15 may convey free molecules of fluid 25, thereby spreading the hydration process throughout hygroscopic material 10. Absorbing material 15 may continue to retain fluid 25 following hydration, as further described below.

For example, after undergoing hydration, portion 35 may become hardened concrete having structural strength. The structural strength of portion 35 may increase over time. Alternatively, when hygroscopic material 10 is a non-mixing cementitious material, a portion 40 of hygroscopic material 10 may not be contacted by fluid 25, and may therefore remain in a dry, un-hydrated state. When hygroscopic material 10 is a non-mixing cementitious material, portion 35 may help to structurally retain portion 40 in place. For example, when portion 35 substantially covers all of surface 30, portion 35 may structurally retain portion 40 and substantially prevent hygroscopic material 10 from being disturbed by external forces such as, for example, from running water. Alternatively, when hygroscopic material 10 is a mixed cementitious material, both portions 35 and 40 may undergo hydration with or without contact from fluid 25 because the mixed cementitious material may already include fluid that causes hydration.

Figure 3:
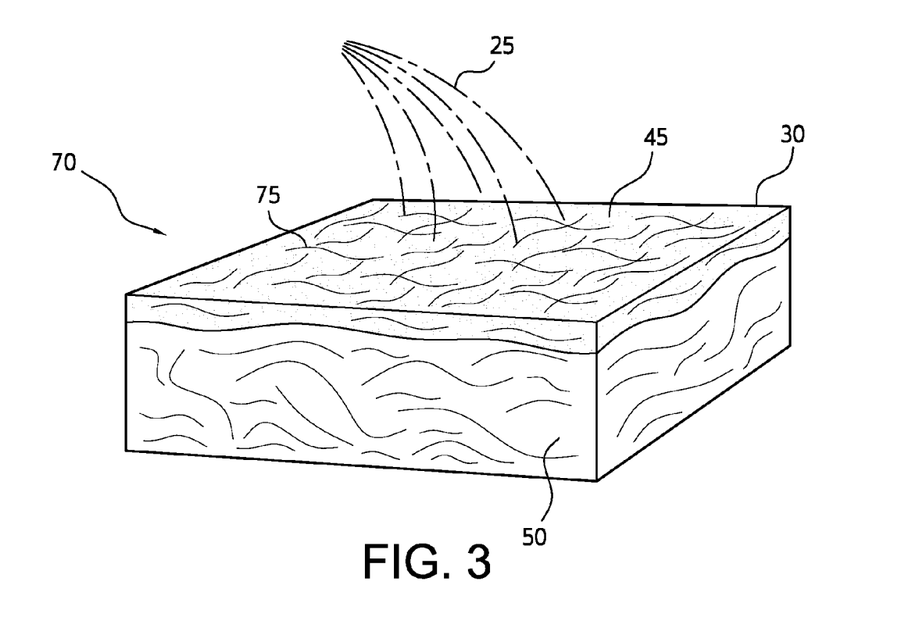
FIG. 3 is another schematic illustration of an exemplary hygroscopic material.

As illustrated in FIG. 3, the portion of hygroscopic material 10 that is contacted by fluid 25 may increase to a portion 45. Portion 45 may extend to a substantial depth within hygroscopic material 10. For example, portion 45 may extend several inches or several feet within hygroscopic material 10. When hygroscopic material 10 is a non-mixing cementitious material, similar to portion 35 above, un-hydrated portions of portion 45 may undergo hydration when contacted by fluid 25 and may gain structural strength that increases over time. For example, portion 45 may become hardened concrete having structural strength. When hygroscopic material 10 is a non-mixing cementitious material, a portion 50 of hygroscopic material 10 may not be contacted by fluid 25, and may therefore remain in a dry, un-hydrated state. When hygroscopic material 10 is a non-mixing cementitious material, portion 45 may help to structurally retain portion 50, similar to portions 35 and 40 above. Alternatively, when hygroscopic material 10 is a mixed cementitious material, both portions 45 and 50 may undergo hydration with or without contact from fluid 25 because the mixed cementitious material may already include fluid that causes hydration.

Figure 4:
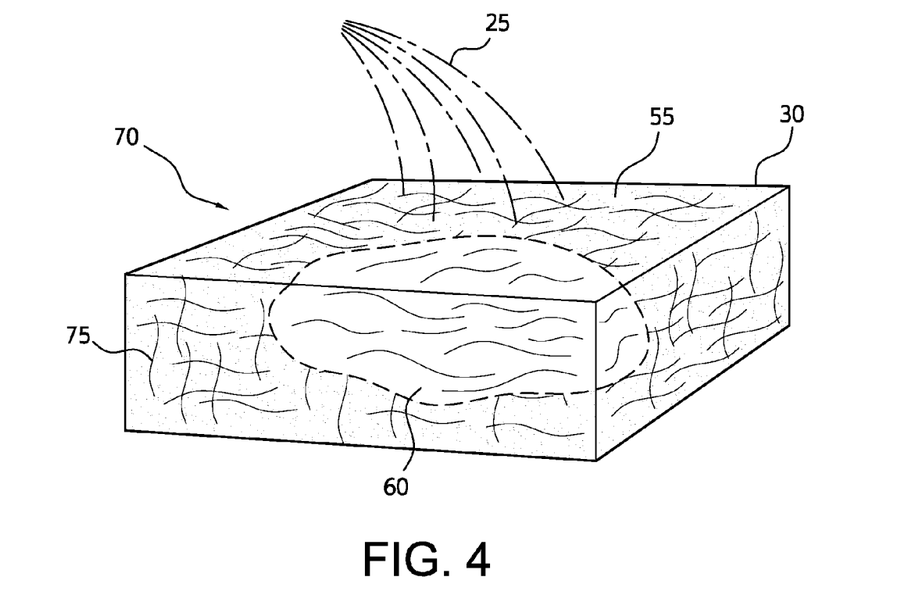
FIG. 4 is another schematic illustration of an exemplary hygroscopic material.

As illustrated in FIG. 4, the portion of hygroscopic material 10 that is contacted by fluid 25 may increase to a portion 55. Portion 55 may extend to a substantial depth within hygroscopic material 10. For example, portion 55 may extend almost entirely throughout hygroscopic material 10. When hygroscopic material 10 is a non-mixing cementitious material, similar to portions 35 and 45 above, un-hydrated portions of portion 55 may undergo hydration when contacted by fluid 25 and may gain structural strength that increases over time. For example, portion 55 may become hardened concrete having structural strength. When hygroscopic material 10 is a non-mixing cementitious material, a portion 60 of hygroscopic material 10 may not be contacted by fluid 25, and may therefore remain in a dry, un-hydrated state. When hygroscopic material 10 is a non-mixing cementitious material, portion 55 may help to structurally retain portion 60, similar to portions 35, 40, 45, and 50 above. Alternatively, when hygroscopic material 10 is a mixed cementitious material, both portions 55 and 60 may undergo hydration with or without contact from fluid 25 because the mixed cementitious material may already include fluid that causes hydration.

Figure 5:
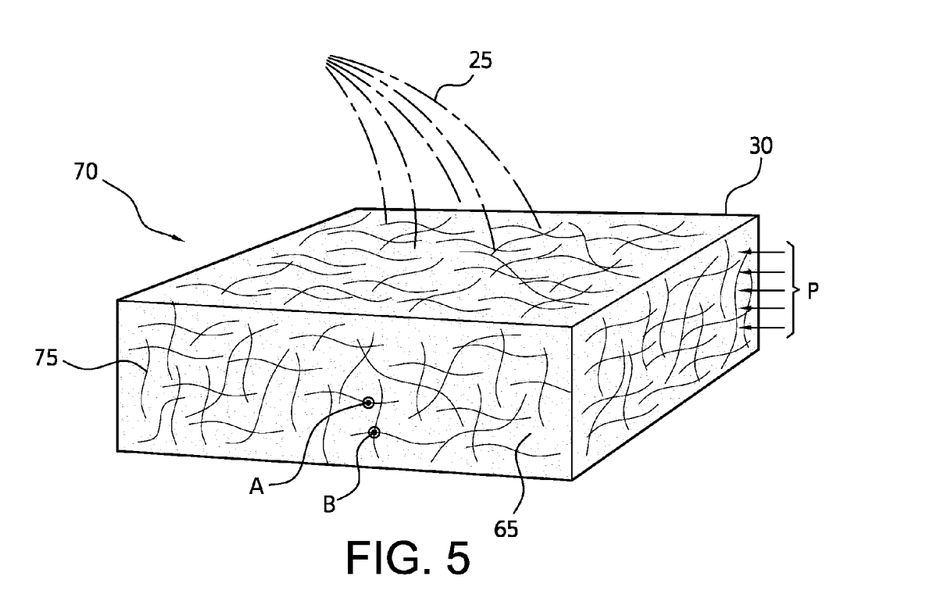
FIG. 5 is another schematic illustration of an exemplary hygroscopic material.

As illustrated in FIG. 5, the portion of hygroscopic material 10 that is contacted by fluid 25 may increase to a portion 65. Portion 65 may extend substantially throughout an entire volume of hygroscopic material 10. When hygroscopic material 10 is a non-mixing cementitious material, similar to portions 35, 45, and 55 above, un-hydrated portions of portion 65 may undergo hydration when contacted by fluid 25 and may gain structural strength that increases over time. For example, portion 65 may become hardened concrete having structural strength. Alternatively, when hygroscopic material 10 is a mixed cementitious material, portion 65 may undergo hydration with or without contact from fluid 25 because the mixed cementitious material may already include fluid that causes hydration.

As illustrated in FIGS. 3-5, a passageway system 70 may be formed in absorbing material 15 disposed in portions 35, 45, 55, and 65 as hygroscopic material 10 undergoes hydration to become a hydrated matrix such as, for example, hardened concrete. Accordingly, passageway system 70 formed in absorbing material 15 may increase in size as portions 35, 45, 55, and 65 of hygroscopic material 10 become hydrated. During hydration, absorbing material 15 may become fixed in the hydrated matrix of hygroscopic material 10. Passageway system 70 included within absorbing material 15 may include a plurality of passageways 75. The plurality of passageways 75 of passageway system 70 may form an intricate network of passageways that retains fluid 25 within hygroscopic material 10 for a relatively longer time period than conventional cementitious material.

The plurality of passageways 75 may form a capillary system in absorbing material 15 that transfers fluid throughout the hydrated matrix of hygroscopic material 10. The capillary system may form due to intermolecular forces between fluid 25 and surfaces of the plurality of passageways 75 transporting fluid 25. The plurality of passageways 75 may have diameters sufficiently small enough so that a combination of surface tension caused by cohesion within fluid 25 and adhesive forces between fluid 25 and surfaces of the plurality of passageways 75 exert a force on fluid 25. Accordingly, these forces due to cohesion and adhesion cause fluid 25 to move through the capillary system of passageway system 70.

Absorbing material 15 disposed in hygroscopic material 10 may draw in fluid 25 disposed on any outside surface (e.g., surface 30) of hygroscopic material 10 through a wicking action. If absorbing material 15 is dry or relatively dry, absorbing material 15 may draw in fluid 25 through wicking action (e.g., capillary action). Absorbing material 15 may thereby absorb fluid 25 on any outside surface (e.g., surface 30) into hygroscopic material 10.

Figure 6:
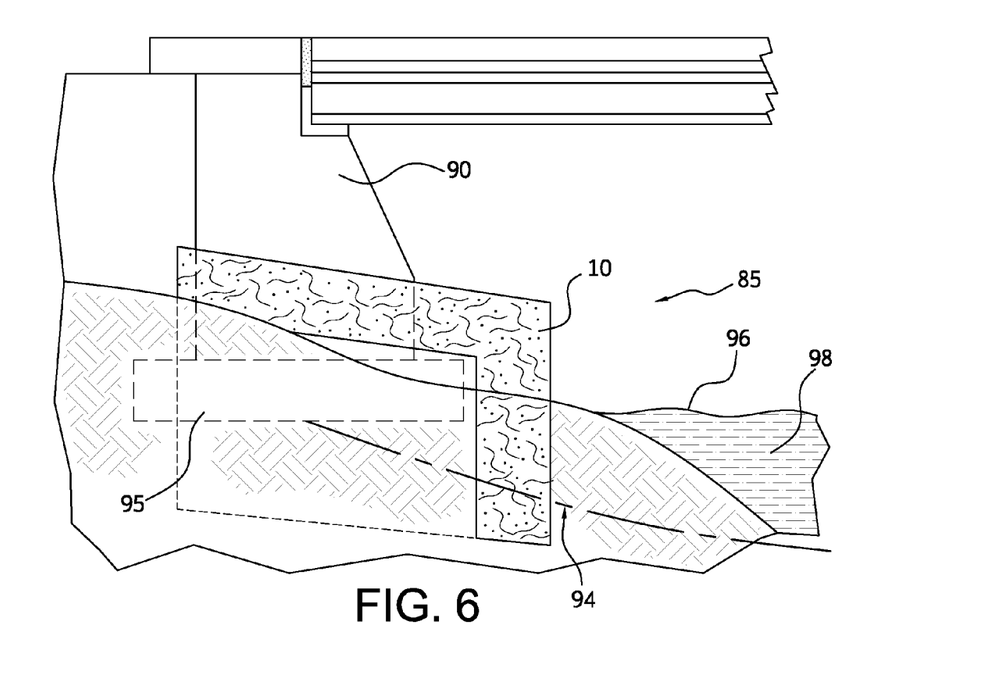
FIG. 6 is a schematic illustration of an exemplary erosion mitigation system.

Hygroscopic material 10 may be used in any suitable application such as, for example, civil engineering works such as transportation and building structures, waterways, and infrastructure. For example, as illustrated in FIG. 6, hygroscopic material 10 may be used in an erosion mitigation system 85. Hygroscopic material 10 may be placed around an abutment 90 and a footing 95, thereby mitigating erosion of a bridge substructure in the case of flooding by a rise in a water level 96 of a body of water 98.

INDUSTRIAL APPLICABILITY

Hygroscopic material 10 may be used in any suitable construction or structural application involving absorbing a fluid. For example, hygroscopic material 10 may be used in any structural application such as, for example, transportation and building structures, waterways, and infrastructure, in which cementitious material is used and/or water is absorbed. Also, for example, hygroscopic material 10 may be used in construction applications for mitigating erosion such as, for example, levees, dikes, channels, and gravity walls.

Figure 7:
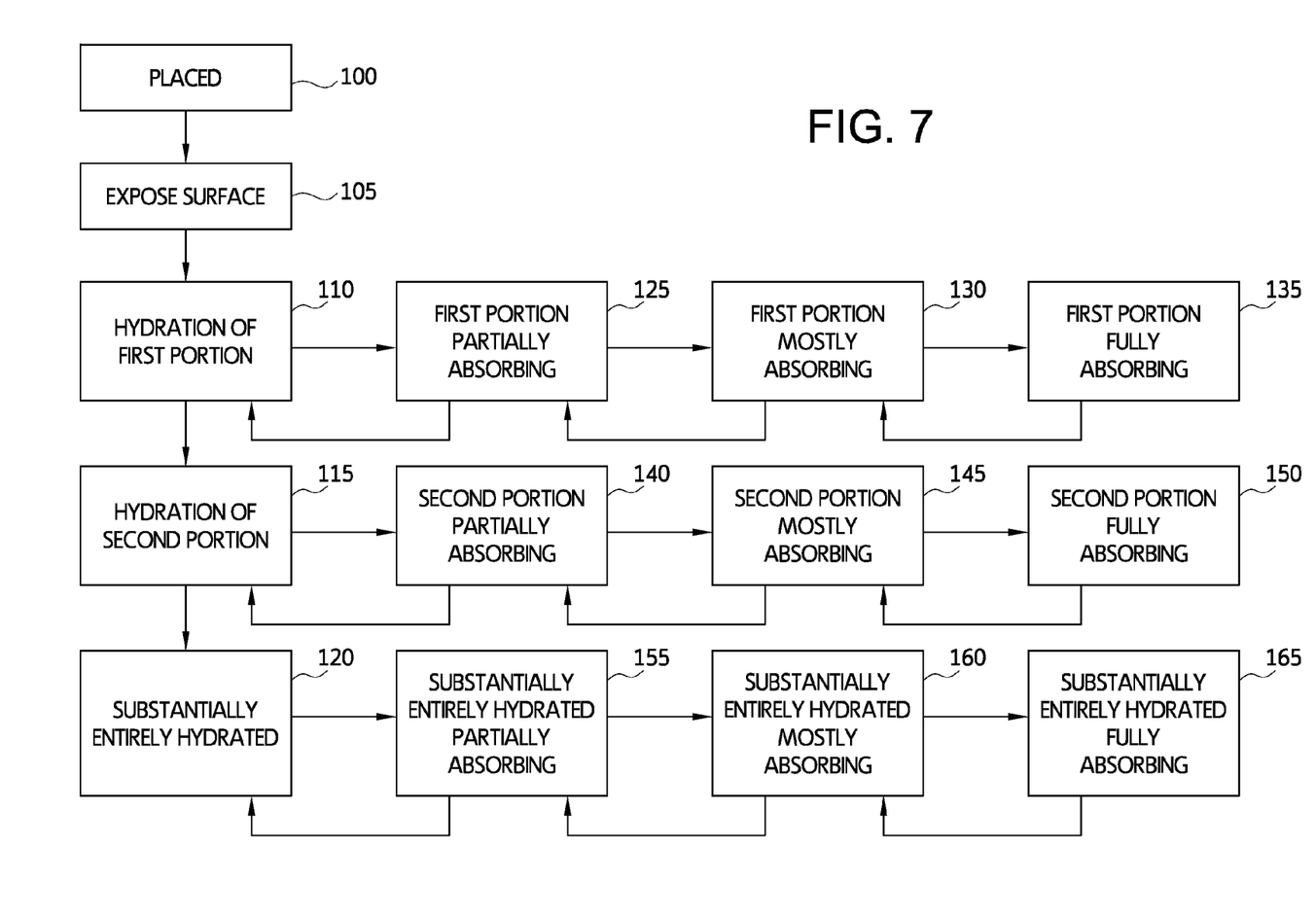
FIG. 7 is a flow chart of an exemplary disclosed method.

FIG. 7 illustrates a method for using hygroscopic material 10. In step 100, when hygroscopic material 10 is a non-mixing cementitious material, hygroscopic material 10 is placed dry without mixing, with or without formwork 28. Alternatively, when hygroscopic material 10 is a mixed cementitious material, hygroscopic material 10 is placed as a mix using formwork 28. It is also contemplated that hygroscopic material 10 may be placed as a mix without using formwork 28. As illustrated in FIG. 6, hygroscopic material 10 is placed at a suitable location such as, for example, a bridge abutment.

Referring back to FIG. 7, in step 105, surface 30 of hygroscopic material 10 is exposed to fluid 25. Fluid 25 contacts portion 35 of surface 30. For example, fluid 25 may be rainwater or a light mist of water or construction compound sprayed by construction personnel. When hygroscopic material 10 is a non-mixing cementitious material, the hygroscopic material of portion 35 becomes hydrated after being contacted by fluid 25. When hygroscopic material 10 is a non-mixing cementitious material, portion 35 structurally retains portion 40 and substantially prevents hygroscopic material 10 from being disturbed by external forces. For example, if water level 96 of body of water 98 illustrated in FIG. 6 rises, portion 35 substantially prevents hygroscopic material 10 from washing away. Alternatively, when hygroscopic material 10 is a mixed cementitious material, both portions 35 and 40 undergo hydration with or without contact from fluid 25.

During hydration of hygroscopic material 10, absorbing material 15 conveys free molecules of fluid 25, thereby spreading the hydration process throughout hygroscopic material 10. Absorbing material 15 continues to retain fluid 25 following hydration, thereby increasing a weight of hygroscopic material 10 when fluid 25 is absorbed by absorbing material 15. Absorbing material 15 continues to retain fluid 25 following hydration, until a point in time in which evaporation or some other removal of fluid 25 from absorbing material 15 may occur. If evaporation occurs and substantially all fluid 25 evaporates from absorbing material 15, absorbing material 15 becomes dry. Subsequently, if fluid 25 again moves into absorbing material 15, absorbing material 15 will re-absorb fluid 25. For example, if absorbing material 15 is substantially fully dry or partially dry, absorbing material 15 may re-absorb fluid 25. Absorbing material 15 continues the cycle of absorbing and releasing fluid 25 based on the presence, movement, and/or evaporation of fluid 25 in hygroscopic material 10. Fluid 25 may also be removed from absorbing material 15 during hydration of hygroscopic material 10. It is contemplated that fluid 25 may be removed from absorbing material 15 by other methods other than evaporation such as, for example, being exposed to a vacuum or other activities suitable for removing fluid 25 from hygroscopic material 10.

Referring back to FIG. 7, in step 110, the portion of hygroscopic material 10 that is contacted by fluid 25 increases to portion 45 as fluid 25 moves further into hygroscopic material 10. Fluid 25 may be, for example, rainwater that seeps into hygroscopic material 10. Also for example, fluid 25 may be portions of body of water 98 if water level 96 illustrated in FIG. 6 rises. Absorbing material 15 becomes fixed in the hydrated matrix of hygroscopic material 10. The plurality of passageways 75 of passageway system 70 are formed within absorbing material 15 that is fixed in the hydrated matrix of hygroscopic material 10. The number of passageways 75 increases and passageway system 70 expands in size to extend throughout portion 45. When hygroscopic material 10 is a non-mixing cementitious material, some of fluid 25 causes portion 45 to hydrate. When hygroscopic material 10 is a non-mixing cementitious material, portion 45 structurally retains portion 50 and substantially prevents hygroscopic material 10 from being disturbed by external forces. Alternatively, when hygroscopic material 10 is a mixed cementitious material, both portions 45 and 50 undergo hydration with or without contact from fluid 25. Also, some of fluid 25 is absorbed by absorbing material 15, as discussed in step 125 below. Further, some of fluid 25 moves under pressure through the plurality of passageways 75 of passageway system 70, as discussed below.

In step 115, the portion of hygroscopic material 10 that is contacted by fluid 25 increases to portion 55 as fluid 25 moves further into hygroscopic material 10. Absorbing material 15 becomes fixed in the enlarging hydrated matrix of portion 55 of hygroscopic material 10. The number of passageways 75 increases and passageway system 70 expands in size to extend throughout portion 55. When hygroscopic material 10 is a non-mixing cementitious material, some of fluid 25 causes portion 55 to hydrate. When hygroscopic material 10 is a non-mixing cementitious material, portion 55 structurally retains portion 60 and substantially prevents hygroscopic material 10 from being disturbed by external forces. Alternatively, when hygroscopic material 10 is a mixed cementitious material, both portions 55 and 60 undergo hydration with or without contact from fluid 25. Also, some of fluid 25 is absorbed by absorbing material 15 fixed in the hydrated matrix of hygroscopic material 10, as discussed in step 140 below. Further, some of fluid 25 moves under pressure through the plurality of passageways 75 of passageway system 70, as discussed below.

In step 120, the portion of hygroscopic material 10 that is contacted by fluid 25 increases to portion 65 as fluid 25 moves through substantially all of hygroscopic material 10. Absorbing material 15 becomes fixed in the enlarging hydrated matrix of portion 65 of hygroscopic material 10. The number of passageways 75 increases and passageway system 70 expands in size to extend throughout portion 65. When hygroscopic material 10 is a non-mixing cementitious material, some of fluid 25 causes portion 65 to hydrate. Alternatively, when hygroscopic material 10 is a mixed cementitious material, portion 65 undergoes hydration with or without contact from fluid 25. Also, some of fluid 25 is absorbed by absorbing material 15 fixed in the hydrated matrix of hygroscopic material 10, as discussed in step 155 below. Further, some of fluid 25 moves under pressure through the plurality of passageways 75 of passageway system 70, as discussed below.

When hygroscopic material 10 is a non-mixing cementitious material, it is contemplated that some of the processes described above in steps 105, 110, 115, and 120 may occur nearly simultaneously, depending on the time period in which fluid 25 moves through hygroscopic material 10. For example, if fluid 25 moves rapidly through hygroscopic material 10, many of the processes described above in steps 105, 110, 115, and 120 may occur nearly simultaneously when hygroscopic material 10 is a non-mixing cementitious material. Alternatively, for example, if fluid 25 moves slowly through hygroscopic material 10, the processes described above in steps 105, 110, 115, and 120 may occur at separate times in succession when hygroscopic material 10 is a non-mixing cementitious material (as explained further below).

The hydrated matrix of hygroscopic material 10 gains strength over time. For example, the hydrated matrix of hygroscopic material 10 may be hardened mass concrete that reaches a compressive strength of several thousand psi (lbs/in$^2$). For example, the hydrated matrix of hygroscopic material 10 may reach a compressive strength of between about 1,500 psi and about 5,000 psi.

In step 125, and as referred to above in relation to step 115, some of fluid 25 is absorbed by absorbing material 15 fixed in the hydrated matrix of portion 45 of hygroscopic material 10. As absorbing material 15 absorbs fluid 25, a weight of absorbing material 15 increases, thereby increasing a weight of hygroscopic material 10. As fluid 25 is absorbed by or removed from absorbing material 15, a volume or size of the hydrated matrix of hygroscopic material 10 will remain substantially the same (except, e.g., initial minor expansion and/or shrinkage). Therefore, as fluid 25 is absorbed into absorbing material 15 of hygroscopic material 10, the weight of hygroscopic material 10 increases (because a volume or size of the hydrated matrix of hygroscopic material 10 remains substantially constant as fluid 25 is absorbed). Similarly, as fluid 25 is removed from absorbing material 15 of hygroscopic material 10, the weight of hygroscopic material 10 decreases (because a volume or size of the hydrated matrix of hygroscopic material 10 remains substantially constant as fluid 25 is removed). One of three events may occur in relation to step 125. In a first case, absorbing material 15 of portion 45 retains a constant amount of fluid 25, thereby maintaining a constant weight (e.g., absorbing material 15 remains at the weight of step 125). In a second case, absorbing material 15 of portion 45 releases fluid 25, thereby decreasing in weight and decreasing the weight of hygroscopic material 10. In this second case, fluid 25 is removed from absorbing material 15, for example, by evaporation into the air adjacent to hygroscopic material 10 via passageway system 70. In this second case, absorbing material 15 of portion 45 may return to a substantially dry state (e.g., moving from step 125 back toward step 110, as illustrated in FIG. 7). In a third case, additional fluid 25 is absorbed by absorbing material 15 fixed in the hydrated matrix of portion 45 of hygroscopic material 10 (e.g., moving from step 125 toward step 130, as illustrated in FIG. 7). It is also contemplated that absorbing material 15 may absorb or release varying amount of fluid 25 between steps 110, 125, 130, and 135 (e.g., release fluid 25 and move from step 125 toward 110, but begin absorbing fluid 25 again before step 110 is reached and instead move back toward step 125, as illustrated in FIG. 7).

In step 130, because absorbing material 15 has absorbed additional fluid 25, a weight of absorbing material 15 is increased further, thereby further increasing a weight of hygroscopic material 10. One of three events similar to the events of the three cases described above for step 125 may then occur: a substantially constant amount of fluid 25 is retained and thereby a constant weight is maintained; fluid 25 is released and a weight of absorbing material 15 decreases and the weight of step 125 may be reached (e.g., moving from step 130 back toward step 125, as illustrated in FIG. 7); or additional fluid 25 is absorbed by absorbing material 15 fixed in the hydrated matrix of portion 45 of hygroscopic material 10 (e.g., moving from step 130 toward step 135, as illustrated in FIG. 7).

In step 135, absorbing material 15 fixed in the hydrated matrix of portion 45 of hygroscopic material 10 has absorbed a maximum amount of fluid 25. A weight of absorbing material 15 in step 135 is therefore higher than the weight of absorbing material 15 in step 130. Absorbing material 15 either: holds the maximum amount of fluid 25 and thereby remains at a constant weight, or fluid 25 is released and a weight of absorbing material 15 decreases and the weight of step 130 may be reached (e.g., moving from step 135 back toward step 130, as illustrated in FIG. 7).

During steps 125, 130, and 135, fluid 25 may also move through passageway system 70 or into portion 55.

Steps 140, 145, and 150 for portion 55 are similar to steps 125, 130, and 135 above for portion 45. Therefore, in steps 140, 145, and 150, a variable amount of fluid 25 is absorbed by absorbing material 15 fixed in the hydrated matrix of portion 55 of hygroscopic material 10. During steps 140, 145, and 150, fluid 25 may also move through passageway system 70 or into portion 65.

Steps 155, 160, and 165 for portion 65 are similar to steps 125, 130, and 135 above for portion 45. Therefore, in steps 155, 160, and 165, a variable amount of fluid 25 is absorbed by absorbing material 15 fixed in the hydrated matrix of portion 65 of hygroscopic material 10. During steps 155, 160, and 165, fluid 25 may move via passageway system 70 throughout substantially all of hygroscopic material 10.

Therefore, when hygroscopic material 10 is a non-mixing cementitious material, varying amounts of fluid 25 may move through hygroscopic material 10 as a size of the hydrated matrix due to contact with fluid 25 increases (e.g., portions 45, 55, and 65). Also, when hygroscopic material 10 is either a non-mixing cementitious material or a mixed cementitious material, a varying amount of fluid 25 is absorbed by absorbing material 15.

For example, when hygroscopic material 10 is a non-mixing cementitious material, hygroscopic material 10 may be in a substantially dry state (e.g., step 100). Also, for example, hygroscopic material 10 may be in a partially hydrated state (e.g., some portions of hygroscopic material 10 are hydrated) or a substantially fully hydrated state in which absorbing material 15 has absorbed substantially no fluid 25 (e.g., steps 105, 110, 115, and 120) when hygroscopic material 10 is a non-mixing cementitious material. Additionally, for example, hygroscopic material 10 may be in a partially hydrated state (e.g., some portions of hygroscopic material 10 are hydrated) in which absorbing material 15 has only partially absorbed fluid 25 (e.g., steps 125, 130, 140, and 145) when hygroscopic material 10 is a non-mixing cementitious material. Also, for example, hygroscopic material 10 may be in a partially hydrated state (e.g., some portions of hygroscopic material 10 are hydrated) in which absorbing material 15 has substantially fully absorbed fluid 25 to a maximum amount (e.g., steps 135 and 150) when hygroscopic material 10 is a non-mixing cementitious material. Further, for example, hygroscopic material 10 may be in a substantially fully hydrated state in which absorbing material 15 has only partially absorbed fluid 25 (e.g., steps 155 and 160) when hygroscopic material 10 is a non-mixing cementitious material. Additionally, for example, hygroscopic material 10 may be in a substantially fully hydrated state in which absorbing material 15 has substantially fully absorbed fluid 25 to a maximum amount (e.g., step 165) when hygroscopic material 10 is a non-mixing cementitious material.

Alternatively, for example, when hygroscopic material 10 is a mixed cementitious material, hygroscopic material 10 may be in a hydrating or substantially fully hydrated state in which absorbing material 15 contains substantially no fluid 25 (e.g., steps 100, 105, 110, 115, and 120). Also, for example, hygroscopic material 10 may be in a hydrating or substantially fully hydrated state in which absorbing material 15 has only partially absorbed fluid 25 (e.g., steps 125, 130, 140, 145, 155, and 160) when hygroscopic material 10 is a mixed cementitious material. Further, for example, hygroscopic material 10 may be in a hydrating or substantially fully hydrated state in which absorbing material 15 has substantially fully absorbed fluid 25 to a maximum amount (e.g., steps 135, 150, and 165) when hygroscopic material 10 is a mixed cementitious material.

Accordingly, as illustrated in FIG. 7, absorbing material 15 of hygroscopic material 10 absorbs and releases a varying amount of fluid 25 not used in hydration to change the weight of hygroscopic material 10. As absorbing material 15 absorbs an increasing amount of fluid 25, a weight of hygroscopic material 10 increases. As fluid 25 is removed from absorbing material 15, a weight of hygroscopic material 10 decreases. Absorbing material 15 may temporarily absorb fluid 25 because absorbing material 15 may both absorb and release fluid 25 (e.g., fluid 25 is removed), and may re-absorb fluid 25. In contrast, some or substantially all of fluid 25 used in the hydration process may not be temporarily absorbed because it may not be released or removed after hydration.

Internal movement (e.g., during hydration) of fluid 25 through the plurality of passageways 75 of passageway system 70 is caused due to drawing action from absorbing material 15 and/or cement binder disposed in hygroscopic material 10. Following hydration, fluid 25 is drawn through the plurality of passageways 75 of passageway system 70 formed in absorbing material 15. Absorbing material 15 disposed in hygroscopic material 10 may draw in fluid 25 disposed on any outside surface (e.g., surface 30) of hygroscopic material 10 through wicking action. The drawing action and/or wicking action of absorbing material 15 may cause various locations of high pressure and low pressure (e.g., a high pressure portion A and a low pressure portion B, as illustrated in FIG. 5).

Fluid 25 moves via one or more of the plurality of passageways 75 of passageway system 70 from high pressure portion A of absorbing material 15 to low pressure portion B of absorbing material 15. Movement between areas of absorbing material 15 having different pressures via passageway system 70 helps in the absorption and transportation of fluid 25 throughout hygroscopic material 10. Also, it is contemplated that an external hydrostatic pressure (e.g., that is a pressure that is greater than a pressure of fluid 25 disposed in hygroscopic material 10) produced at a source located outside of hygroscopic material 10 and exerted on hygroscopic material 10 may create a pressurized system within passageway system 70 that moves fluid 25 (that is at a pressure that is lower than the external hydrostatic pressure) through hygroscopic material 10. For example, external hydrostatic pressure P, as illustrated in FIG. 5, may create a pressurized system within passageway system 70 that moves fluid 25.

The plurality of passageways 75 of passageway system 70 forms an intricate network of passageways that retains fluid 25 within hygroscopic material 10 for a relatively longer time period than conventional cementitious material before, during, and after hydration. Because passageway system 70 retains fluid 25 within hygroscopic material 10 for a relatively longer time period than conventional cementitious material, a weight of hygroscopic material 10 is further increased as compared to conventional cementitious material due to this increased retention of fluid 25.

Hygroscopic material 10, when used dry (e.g., non-mixing), may produce less heat during hydration, and therefore produce relatively less cracking and/or fracturing in hygroscopic material 10, as compared to the hydration of conventional cementitious material. Fluid 25 moves via passageways 75, thereby contacting un-hydrated binder disposed in hygroscopic material 10 and initiating hydration of that un-hydrated binder. Because this process is based on the travel of fluid 25 (e.g., the rate of travel and/or the direction of travel), the hydration process may occur sequentially (e.g., not all at the same time), thereby reducing the amount of heat caused by the hydration process. Accordingly, the heat produced during hydration may be reduced, thereby reducing the amount of fracturing and/or cracks produced in hygroscopic material 10 during hydration. Therefore, less fracturing and/or cracks may be produced in hygroscopic material 10 during hydration, as compared to conventional cementitious material.

If water level 96 of body of water 98 illustrated in FIG. 6 rises, for example, fluid 25 may come from body of water 98. When hygroscopic material 10 is a non-mixing cementitious material, portions of hygroscopic material 10 are already hydrated (e.g., portions 35, 45, and/or 65) so that hydrated surface portions retain un-hydrated portions (e.g., portions 40, 50, 60) in place against being washed away. Alternatively, when hygroscopic material 10 is a mixed cementitious material, substantially all portions of hygroscopic material 10 undergo hydration with or without contact from fluid 25. Body of water 98 provides fluid 25 that moves into hygroscopic material 10 when hygroscopic material 10 is a non-mixing cementitious material or a mixed cementitious material. Hygroscopic material 10 gains strength and increases in weight as described above, increasing capacity to resist external forces and thereby mitigating erosion of abutment 90 and/or footing 95 illustrated in FIG. 6. As illustrated in FIG. 6, hygroscopic material 10 may be placed below a potential scour elevation 94. Potential scour elevation 94 may be a designed washout limit that may be empirically determined for a given structure or location. Installed hygroscopic material 10 that is placed below potential scour elevation 94, as illustrated in FIG. 6, may protect abutment 90 and/or footing 95 from being scoured during erosion caused by increased flow of body of water 98.

Because absorbing material 15 of hygroscopic material 10 may increase in weight based on absorbing and re-absorbing fluid 25, hygroscopic material 10 may increase in weight to resist external forces. Accordingly, hygroscopic material 10 may mitigate erosion caused by external forces such as, for example, running water, ocean tides, and/or rising water. Also, hygroscopic material 10 may be placed quickly and immediately gain strength and weight when exposed to fluid 25, which may include liquid that may cause external forces leading to erosion such as, for example, running water, ocean tides, and/or rising water. Hygroscopic material 10 may therefore absorb and/or re-absorb fluid 25 to increase in weight, thereby increasing capacity to resist external forces to mitigate erosion at desired locations such as, for example, coastal areas, structural footings and abutments, river banks, low-lying soil, areas with high water tables, and areas located in flood plains It will be apparent to those skilled in the art that various modifications and variations can be made to the disclosed cementitious materials and methods for using cementitious materials. Other embodiments will be apparent to those skilled in the art from consideration of the specification and practice of the disclosed method and material. It is intended that the specification and examples be considered as exemplary only, with a true scope being indicated by the following claims and their equivalents.

What is claimed is:

1. A method, comprising:
providing a cementitious material, the cementitious material including an absorbing material, wherein the absorbing material is a super-absorbent material that comprises hollow, tubular-shaped fibers that convey fluid through an inside of the hollow, tubular-shaped fibers by capillary action, such that a plurality of passageways extend through the concrete material;
absorbing a fluid into the absorbing material by the capillary action during hydration of the cementitious material; and
retaining the fluid in the absorbing material after hydration of the cementitious material.

2. The method of claim 1, further comprising removing substantially all of the fluid from the absorbing material after retaining the fluid in the absorbing material after hydration of the cementitious material.

3. The method of claim 1, wherein a weight of the cementitious material increases when the fluid is absorbed into the absorbing material.

4. The method of claim 2, wherein a weight of the cementitious material decreases when the fluid is removed from the absorbing material.

5. The method of claim 2, further comprising re-absorbing the fluid or another fluid into the absorbing material after removing substantially all of the fluid.

6. The method of claim 2, wherein removing the fluid from the absorbing material includes evaporation of the fluid from the absorbing material.

7. The method of claim 1, wherein:
the cementitious material is concrete; and
the fluid is water.

8. The method of claim 1, wherein the cementitious material is non-mixing concrete.

9. The method of claim 1, wherein the absorbing material includes a super-absorbent material that includes at least one of a natural fiber, a synthetic fiber, a micro fiber, and a tubular material.

10. A material, comprising:
   a concrete material in a hydrated state, the concrete material including a super-absorbent material dispersed throughout the concrete material, and
   an aggregate material;
   wherein the super-absorbent material comprises hollow, tubular-shaped fibers that convey fluid through an inside of the hollow, tubular-shaped fibers by capillary action, such that a plurality of passageways extend through the concrete material; and
   wherein the super-absorbent material is more absorbent than the aggregate material.

11. The material of claim 10, wherein the hollow, tubular-shaped fibers have a diameter sized to draw in fluid disposed on an outside surface of the concrete material and to retain the fluid until the fluid evaporates.

12. The material of claim 10, wherein the super-absorbent material includes at least one of a cellulose fiber, cotton, and paper.

13. The material of claim 10, wherein the concrete material is non-mixing concrete.

14. The material of claim 10, wherein the concrete material is mixed concrete.

15. The material of claim 10, wherein the concrete material is unreinforced mass concrete.

16. A method, comprising:
   providing a cementitious material, the cementitious material including an absorbing material, wherein the absorbing material is a super-absorbent material that comprises hollow, tubular-shaped fibers that convey fluid through an inside of the hollow, tubular-shaped fibers by capillary action, such that a plurality of passageways extend through the concrete material;
   absorbing a fluid into the absorbing material during hydration of the cementitious material;
   moving the fluid through the absorbing material by the capillary action during hydration of the cementitious material; and
   retaining the fluid in the absorbing material after hydration of the cementitious material.

17. The method of claim 16, further comprising moving the fluid through the absorbing material after hydration of the cementitious material using external hydrostatic pressure.

18. The method of claim 16, wherein a weight of the cementitious material increases when the fluid is absorbed into the absorbing material.

19. The method of claim 16, further comprising:
   removing substantially all of the fluid from the absorbing material after retaining the fluid in the absorbing material after hydration of the cementitious material; and
   re-absorbing the fluid or another fluid into the absorbing material after removing substantially all of the fluid.

20. The method of claim 19, wherein a weight of the cementitious material decreases when the fluid is removed from the absorbing material.

* * * * *